United States Patent [19]

Vollmann

[11] Patent Number: 5,357,390
[45] Date of Patent: Oct. 18, 1994

[54] MAGNETIC TAPE WITH A CYLINDRICAL MAGNETIC HEAD HOUSING

[75] Inventor: Norbert C. Vollmann, Eindhoven, Netherlands

[73] Assignee: U.S. Philips Corporation, New York, N.Y.

[21] Appl. No.: 949,654

[22] Filed: Sep. 23, 1992

[30] Foreign Application Priority Data

Dec. 11, 1991 [EP] European Pat. Off. ........ 91203255.4

[51] Int. Cl.$^5$ ............................................. G11B 15/60
[52] U.S. Cl. ................................................. 360/130.21
[58] Field of Search ........................... 360/130.21, 104

[56] References Cited

U.S. PATENT DOCUMENTS

| | | | |
|---|---|---|---|
| 3,207,517 | 9/1965 | Tanigawa | 360/104 |
| 4,340,918 | 7/1982 | Jansen | 360/104 |
| 4,926,278 | 5/1990 | Schoenmakers | |
| 5,016,132 | 5/1991 | Okuda | 360/130.21 |
| 5,202,808 | 4/1993 | Saito | 360/130.21 |

Primary Examiner—A. J. Heinz
Attorney, Agent, or Firm—Brian J. Wieghaus

[57] ABSTRACT

An apparatus (1) has a magnetic-head unit (17) with a housing (18) in which a magnetic head (47) is situated. The magnetic head (47) has a head face (49) in which a gap end of a transducing gap (51) extends and a first mounting surface (107) perpendicular to a gap plane (59) through the transducing gap (51). The magnetic-head unit (17) has a front section (29) of which tape guides (31, 33) form part and which is provided with a second mounting surface (75), which is positioned relative to the first mounting surface (107) of the magnetic head (47). This results in an accurately defined position of the magnetic head (47) relative to the tape guides (31, 33).

17 Claims, 6 Drawing Sheets

MAGNETIC TAPE WITH A CYLINDRICAL MAGNETIC HEAD HOUSING

BACKGROUND OF THE INVENTION

1. Field of the Invention

The invention relates to an apparatus suitable for cooperation with a cassette provided with magnetic tape, which apparatus includes tape-transport means for the transport of the magnetic tape in the longitudinal direction, a magnetic-head unit having a housing, a magnetic head arranged in the housing for reading and-/or writing information on magnetic tape and having at least one transducing gap and a head face in which a gap end of the transducing gap is situated, and two tape guides, each at one side of the transducing gap and each having a guide surface.

The invention also relates to a magnetic-head unit and to a magnetic head for use in such apparatus, and to a housing suitable for use in the magnetic-head unit.

The invention further relates to a method of manufacturing a magnetic-head unit comprising a housing and a magnetic head, which method comprises the following steps: manufacturing the housing provided with tape guides and height guides, manufacturing the magnetic head provided with at least one transducing gap and a head face, positioning the magnetic head in the housing, causing a gap plane through the transducing gap to be oriented perpendicularly to a connecting line between the height guides, and affixing the magnetic head in the housing.

2. Description of the Prior Art

An apparatus, a magnetic-head unit and a method of the type defined above are known from U.S. Pat. No. 4,926,278, herewith incorporated by reference). For the reproduction of information recorded on a magnetic tape it is desirable that the position of the transducing gap of the magnetic head relative to the magnetic tape is the same as during the process in which this information has been recorded on the magnetic tape. If this position is not the same this will result in signal loss during information reading. Moreover, it is desirable that the position of the magnetic tape relative to the magnetic head is the same for each apparatus. This is in order to ensure that a recording made on one apparatus can be reproduced without signal loss by means of another apparatus.

During the recording or reproduction of information on/from a magnetic tape by means of this known apparatus the magnetic tape always occupies the same position relative to the magnetic head. In the known apparatus the correct position of the magnetic tape relative to the magnetic head is obtained in that during tape transport the magnetic tape is guided by two tape guides of the magnetic-head unit and one tape edge of the magnetic tape is held in contact with height guides of the magnetic-head unit. This accurately defines the position of the magnetic tape relative to the magnetic-head unit. Since the magnetic head is accurately positioned relative to the height guides in the magnetic-head unit this accurately defines the position of the magnetic tape relative to the magnetic head. When the magnetic head is positioned in the magnetic-head unit the transducing gap of the magnetic head should be adjusted not only in a plane parallel to a plane tangent to the tape guides but also in a direction perpendicular to this tangent plane. A drawback of this is that the positioning means required for this purpose should be movable in many directions and rotatable about many axes, so that intricate and therefore expensive position means are needed.

SUMMARY OF THE INVENTION

It is an object of the invention to provide an apparatus of the type defined in the opening paragraph in which the magnetic head is positioned more simply relative to the tape guides.

To this end, the apparatus in accordance with the invention is characterised in that the magnetic head has a first mounting surface, which extends at least substantially perpendicularly to the gap plane, and the housing comprises a front section of which the tape guides form part and which has a second mounting surface parallel to a tangent plane to both guide surfaces, the two mounting surfaces extending parallel to one another. This defines the position of the magnetic head in a direction perpendicular to the tangent plane to the two guide surfaces, so that the positioning means merely have to adjust the magnetic head in a plane parallel to the tangent plane. This enables simpler and hence cheaper positioning means to be used. Moreover, this defines the angles about an axis parallel to the gap plane and through the transducing gap. Thus, three degrees of freedom of the magnetic head relative to the housing and hence relative to a magnetic tape are defined. Now only the three remaining degrees of freedom of the magnetic head have to be defined. This is achieved by adjusting the distance from the transducing gap to the connecting line on which the height guides are situated (which line corresponds to one edge of the magnetic tape) and the angle between the transducing gaps and said connecting line. This means an adjustment of said distance and angle of the transducing gaps relative to the height guides of the magnetic-head unit. Now only the position of the magnetic head in a direction parallel to the longitudinal direction has not yet been adjusted. However, an accurate adjustment of this position is not necessary as long as the magnetic head is situated between the tape guides and the construction in accordance with the invention always meets this requirement. Consequently, in the apparatus in accordance with the invention the magnetic head need be adjusted in only one direction and at one angle.

An embodiment of the apparatus in accordance with the invention is characterised in that the mounting surfaces are interconnected by a positioning member. As a result of this, the mounting surfaces are not in contact with one another, which provides great constructional freedom as regards the location of the magnetic head relative to the front section.

A further embodiment of the apparatus in accordance with the invention is characterised in that the mounting surfaces are in contact with one another. The absence of an element, for example a positioning member, between the mounting surfaces enables the head face to be positioned even more accurately relative to the tape guides.

Still another embodiment of the apparatus in accordance with the invention is characterised in that the magnetic head comprises a third mounting surface which extends at least substantially perpendicularly to the first mounting surface, and the magnetic-head unit comprises a mounting bracket which is connected to the magnetic head at the location of the third mounting surface and to the front section. As a result of this, the first and the second mounting surface are not interconnected directly, so that the connection means, for example an adhesive or welds, cannot affect the position of the first mounting surface relative to the second mounting surface and these surfaces are always positioned correctly against one another.

Yet another embodiment of the apparatus in accordance with the invention, in which the magnetic-head unit comprises two height guides which are situated at first axial ends of the tape guides and disposed on a connecting line perpendicular to a gap plane through the transducing gap, and in which the magnetic-head unit further comprises two control surfaces situated at second axial ends of the tape guides and adapted to guide one tape edge of the magnetic tape, thereby maintaining the other tape edge in contact with the height guides, is characterised in that the control surfaces also form part of the front section.

As the control surfaces bring the magnetic tape into contact with the height guides the magnetic tape occupies always the same position relative to the magnetic head. This means that the control surfaces should always be in contact with the magnetic tape. This is achieved by connecting the control surfaces to the tape guides, so that the control surfaces always occupy the correct position relative to the tape guides and hence relative to the magnetic tape.

As regards the housing an embodiment in accordance with the invention is characterised in that the housing comprises a cylindrical section provided with the height guides, and the front section is secured to the cylindrical section. By dividing the housing into a cylindrical section and a front section the housing can be manufactured simply from metal sheet. This is not possible in the case of a one-piece housing. In comparison with, for example, a plastics a metal has the advantage that it is wear-resistant and can provide magnetic shielding.

An embodiment of the housing in accordance with the invention is characterised in that the cylindrical section comprises a first and a second half, the first half being provided with the height guides and the second half being provided with auxiliary tape guides, and the front section is situated between the height guides and the auxiliary tape guides. If the cylindrical section comprises two halves the height guides and auxiliary tape guides can be accurately and simply spaced from one another by first interposing the front section between the halves and bringing the height guides and auxiliary tape guides into contact with the front section, after which the halves are interconnected, for example by welding.

As regards the magnetic head an embodiment in accordance with the invention is characterised in that the magnetic head has two main parts comprising a substrate, which carries a magnetic-head structure in layers, and a counter-block, which is situated on the magnetic-head structure, the first mounting surface being provided on one of the main parts. During the manufacture of the magnetic head both the head face and the mounting surface can be formed in one clamping operation or in one machining operation, for example by means of an accurate grinding operation. This accurately defines the position of the mounting surface relative to the head face, so that in the magnetic-head unit the head face occupies an accurate position relative to the tape guides.

The method in accordance with the invention is characterised in that the magnetic head is provided with a first mounting surface which extends at least substantially perpendicularly to the gap plane and the head face of the magnetic head is obtained in a subsequent operation in which the head face is formed accurately in relation to the first mounting surface, the housing is provided with a front section comprising the tape guides and a second mounting surface, which front section is manufactured in one step in which the second mounting surface parallel to a tangent plane to the tape guides is formed, and the first mounting surface of the magnetic head is brought into a position parallel to the second mounting surface provided on the housing. The first mounting surface can readily be formed accurately relative to the transducing gaps because both the first mounting surface and the transducing gaps are provided on one and the same element. By connecting this first mounting surface to the second mounting surface of the front section the magnetic head need no longer be adjusted in a direction perpendicular to the mounting surfaces. This simplifies the step of positioning the magnetic head relative to the housing, which enables simpler positioning tools to be used and reduces the time required for positioning, which has lowers costs. This is not possible with conventional magnetic heads because in such heads each transducing gap is formed by two yoke halves placed in an enclosure, which enclosure is subsequently positioned in the housing of the magnetic-head unit. As a result of this, there is no direct relation between the enclosure, on which the first mounting surface may be formed, and the transducing gaps.

An embodiment of the method in accordance with the invention is characterised in that the housing, apart from the front section, is formed from two halves of a cylindrical section provided with the height guides and auxiliary tape guides respectively, the front section being interposed between the height guides and auxiliary tape guides of the two halves, after which the two halves are moved towards one another so that the height guides and the auxiliary tape guides make contact with the front section, after which the two halves are connected to one another and the front section is connected to the two halves. When the magnetic-head unit is manufactured in this way the tape guides accurately adjoin the height guides. If the height of the tape guides is smaller than the width of the magnetic tape one edge of the magnetic tape will be in contact with the control surfaces during operation, causing the opposite edge of the magnetic tape to be pressed against the height guides and the magnetic tape to be positioned accurately relative to the magnetic head.

A further embodiment of the method in accordance with the invention is characterised in that after the height guides and auxiliary tape guides have been brought into contact with the front section a clearance exists between the two halves, and before the two halves are interconnected the halves are positioned relative to one another in a direction parallel to and in a direction perpendicular to the front section in such a way that the height guides and the auxiliary tape guides are aligned with each other. This method and the presence of the clearance between the two halves enables less stringent requirements to be imposed on the dimensioning of the halves, so that these halves can be manufactured simply and cheaply.

Yet another embodiment of the method in accordance with the invention is characterised in that a mounting bracket is secured to the magnetic head, the magnetic head is positioned in the housing by means of an auxiliary tool, and the auxiliary tool comprises two teeth which engage in recesses in the mounting bracket, each tooth of the auxiliary tool being in contact with the mounting bracket at two points. By bringing the auxiliary tool into the contact with the mounting bracket at four points, arranged in opposite pairs, the mounting bracket accurately follows the movements of the auxiliary tool and, in addition, pressure can be exerted on the mounting bracket. The pressure promotes a proper contact between the auxiliary tool and the mounting bracket. The mounting bracket cannot move relative to the auxiliary tool, so that the magnetic head can be positioned accurately.

BRIEF DESCRIPTION OF THE DRAWINGS

The invention will now be described in more detail, by way of example, with reference to the drawings. In the drawings.

DETAILED DESCRIPTION OF THE PREFERRED EMBODIMENTS

Figure 1:
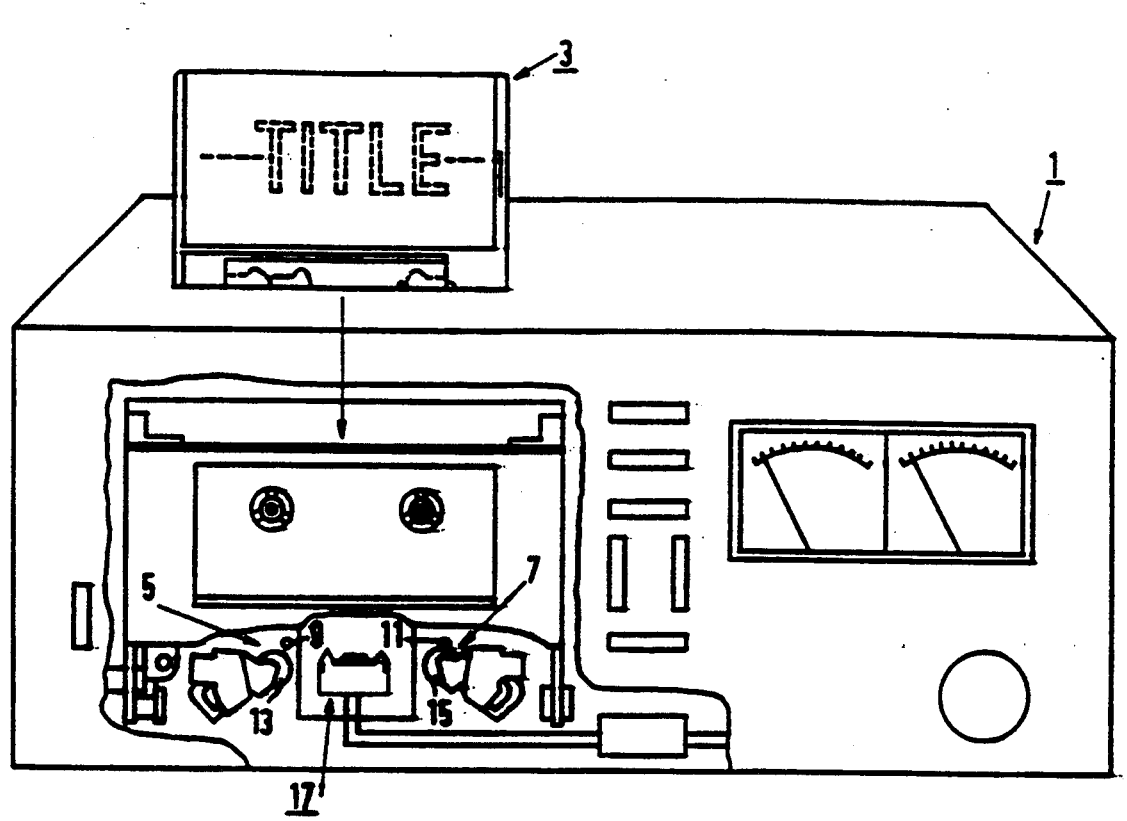
FIG. 1 is a perspective view showing an apparatus with a magnetic-head unit in accordance with the invention and a cassette.

FIG. 1 shows an apparatus 1 suitable for cooperation with a cassette 3 provided with a magnetic tape. The apparatus 1 has tape-transport means 5, 7 for transport of the magnetic tape in the longitudinal direction. These tape-transport means comprise capstans 9, 11 and pressure rollers 13, 15 which cooperate with one another. For reading and writing information on the magnetic tape the apparatus 1 comprises a magnetic-head unit 17.

Figure 2:
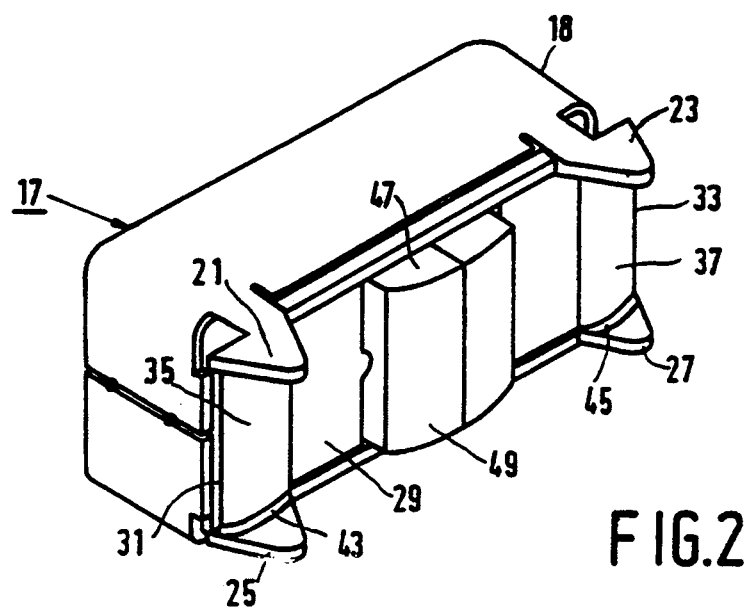
FIG. 2 is a perspective view of the magnetic-head unit provided with a magnetic head and a housing with a front section.

This magnetic-head unit 17 is shown in FIG. 2. The magnetic-head unit has a housing 18, height guides 21, 23 and auxiliary tape guides 25, 27 forming part of this housing. The housing 18 has a front section 29 provided with tape guides 31, 33 having guide surfaces 35, 37. The front section 29 further has two control surfaces 43, which are inclined relative to the guide surfaces 35, 37.

A magnetic head 47, which also forms part of the magnetic-head unit 17, is secured to the front section 29. Preferably, the housing 18 is made of mu-metal, so that the magnetic head 47 is magnetically shielded from the surrounding.

Figure 3:
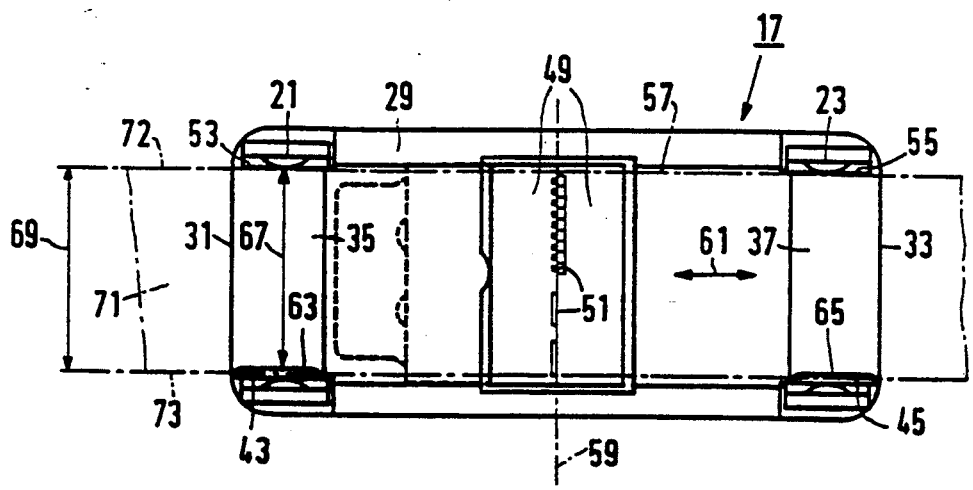
FIG. 3 is a front view of the magnetic-head unit.

The magnetic head 47 has transducing gaps 51 and a head face 49 in which gap ends of the transducing gaps 51 extend, see FIG. 3. The height guides 21, 23 are situated at first axial ends 53, 55 of the tape guides 31, 33 and guide a tape edge 72. The two height guides 21, 23 are disposed on an imaginary connecting line 57, which extends perpendicularly to a gap plane 59 through the transducing gaps 51. As a result of this, the gap ends of the transducing gaps 51 always extend perpendicularly to one of the tape-transport directions 61. However, for this the tape edge 72 should be constantly in contact with the height guides 21, 23. In order to achieve this the control surfaces 43, 45 have been provided opposite the height guides 21, 23 at second axial ends 63, 65 of the tape guides 31, 33. The distance 67 between the height guides 21, 23 and the line of intersection between the control surfaces and the guide surfaces 35, 37 is smaller than the width 67 of the magnetic tape 71. This ensures that the other tape edge 73 is always guided by the control surfaces 43, 45. As these control surfaces are inclined relative to the guide surfaces the magnetic tape is subjected to a force directed towards the height guides, causing the tape edge 72 to be pressed against the height guides 21, 23.

Figure 4:
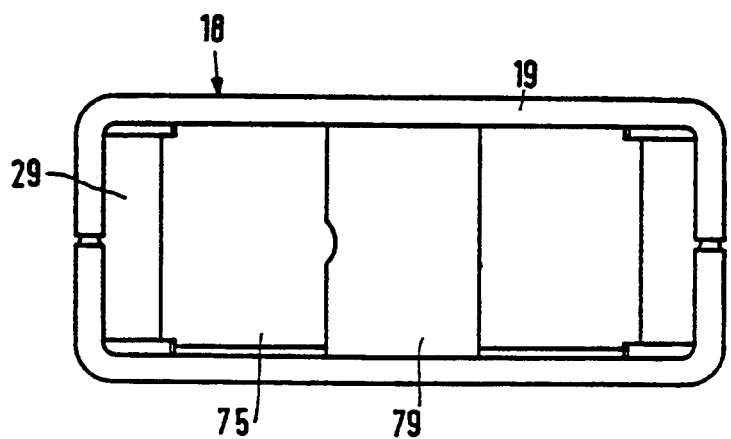
FIG. 4 is rear view of the housing.
Figures 5A, 5B:
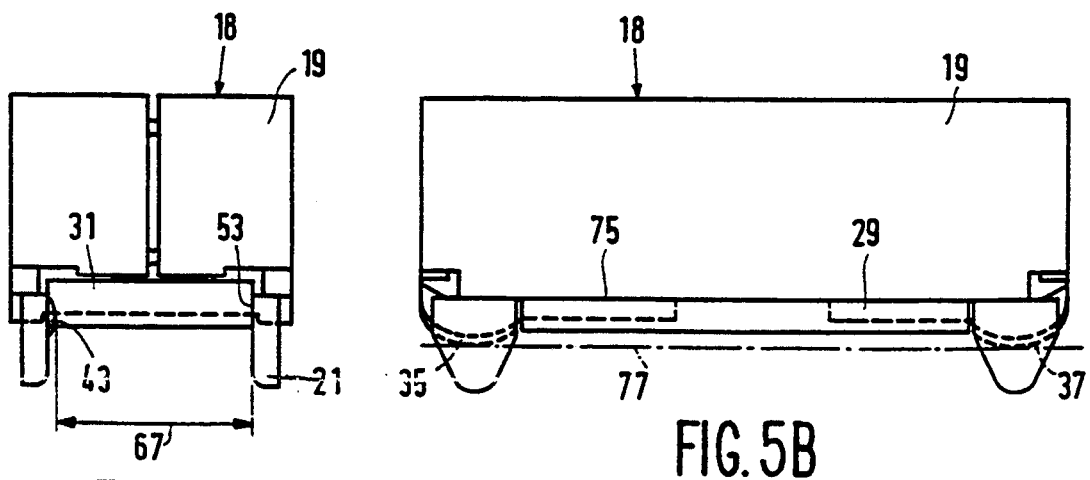
FIG. 5a is a side view of the housing.
FIG. 5b is a plan view of the housing.

FIGS. 4, 5a and 5b show the housing 18. FIG. 4 shows a rear view of the housing. The housing 18 has a cylindrical section 19 and is open at the rear, thus enabling the magnetic head to be mounted on the front section via the rear. The front section comprises a mounting surface 75 on which the magnetic head 47 can be arranged with a mounting surface. The mounting surface 75 of the front section 29 extends parallel to a tangent plane 77 to both guide surfaces 35, 37, see FIG. 5b. By positioning the magnetic head with a mounting surface relative to the mounting surface 75 of the front section 29 the number of degrees of freedom of the magnetic head is reduced. This results inter alia in the position of the magnetic head 47 in a direction perpendicular to the tangent plane 77 to the two guide surfaces 35, 37 being defined. The position of the magnetic head 47 in a direction perpendicular to the tangent plane 77 is important inter alia in order to obtain a proper contact between the magnetic head and the magnetic tape, which is necessary for a correct signal transfer between the magnetic head and the magnetic tape. Moreover, this defines the angles about an axis through the gap ends and about an axis parallel to the imaginary connecting line 57 perpendicular to the gap plane 59. These angles are also important for a proper contact between the magnetic head and the magnetic tape. In this way, three degrees of freedom of the magnetic head relative to the magnetic-head unit and hence relative to a magnetic tape are defined. The position of the magnetic head 47 in a direction parallel to the longitudinal direction of the magnetic tape need not be adjusted if only the magnetic head 47 is situated between the tape guides 31, 33. This requirement is met because the magnetic head extends through an opening 79 in the center of the front section between the tape guides 31, 33 (see FIG. 4). As a result of this, only the two remaining degrees of freedom of the magnetic head have to be defined. This is achieved by adjusting the distance from the transducing gaps to the tape edge 72 of the magnetic tape and adjusting the angle between the transducing gaps 51 and the longitudinal direction of the magnetic tape. This last-mentioned adjustment is obtained by adjusting the angle between the gap plane 59 to an angle of 90 degrees relative to the imaginary connecting line 57 on which the height guides 21, 23 are situated.

Figure 6:
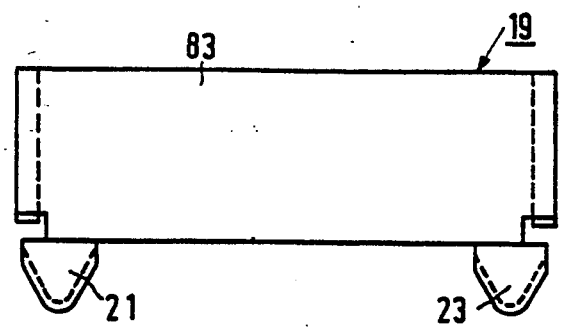
FIG. 6 is a plan view of the cylindrical section.
Figure 7A:
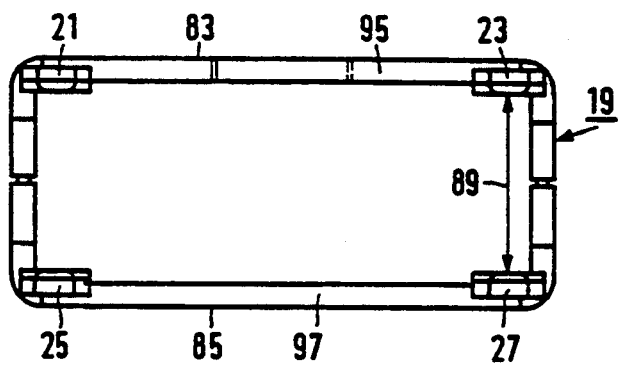
FIG. 7a is a front view of the cylindrical section.
Figure 7B:
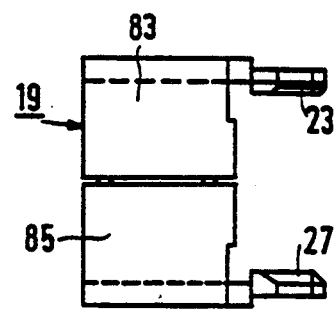
FIG. 7b is a side view of the cylindrical section.

FIGS. 6, 7a and 7b show the cylindrical section 19 of the magnetic-head unit 17. The cylindrical section 19 comprises a first and a second half 83, 85 and is made of a sheet material. The first half 83 comprises the height guides 21, 23 and the second half 85 comprises auxiliary tape guides 25, 27. By first placing the front section 29 between the halves 83, 85 and bringing the height guides 21, 23 and auxiliary tape guides 25, 27 into contact with the front section 29, after which the halves 83, 85 are connected to one another, for example by welding, the height guides 21, 23 and auxiliary tape guides 25, 27 can be spaced from one another accurately and simply. The height guides 21, 23 and the auxiliary tape guides 25, 27 are then spaced at a distance 89 from one another, which distance is equal to the height of a tape guide 31, 33 with a control surface 43, 45. During assembly of the front section 29 with the housing 18 the first axial ends 53, 55 of the tape guides 31, 33 then come into contact with the height guides 21, 23 (see FIG. 5a), so that the distance 67 between the height guides 21, 23 and the control surfaces 43, 44 is smaller than the width 69 of the magnetic tape 71 and in operation the tape edge 72 is pressed against the height guides 21, 23.

Figure 8:
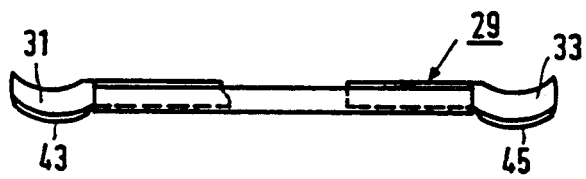
FIG. 8 is a plan view of the front section.
Figure 9A:
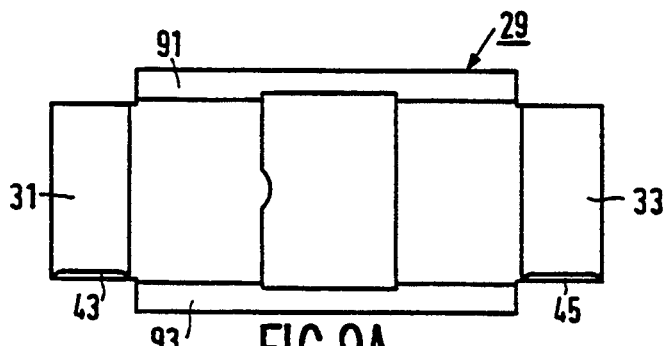
FIG. 9a is a front view of the front section.
Figure 9B:
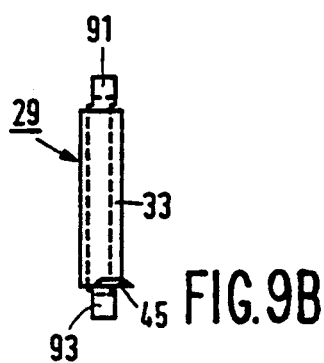
FIG. 9b is a side view of the front section.

FIGS. 8, 9a and 9b show the front section 29 of the magnetic-head unit. The front section 29 is made in one piece and is punched from a sheet material, the tape guides 31, 32 and control surfaces 43, 45 being formed at the same time. The front section 29 is connected to edges 95, 97 (see FIG. 7a) of the cylindrical section 19 by edge portions 91, 93.

Figure 10A:
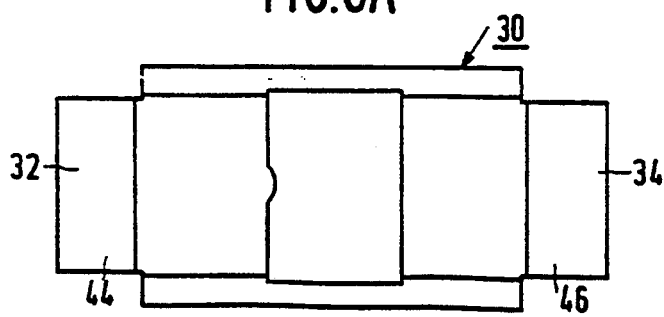
FIG. 10a is a front view of an alternative front section.
Figure 10B:
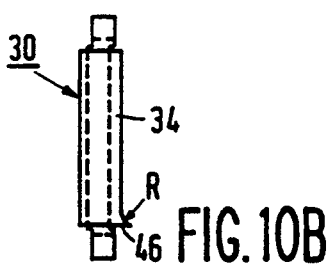
FIG. 10b is a side view of the alternative front section.

FIGS. 10a and 10b show an alternative front section 30 of the magnetic-head unit. This front section 30 also comprises control surfaces 44 and 46, which are situated at one of the ends of the tape guides 32 and 34 and which are curved with radius R. This is in contrast with the control surfaces 43 and 45, which are straight in the view shown in FIGS. 9a and 9b and which are inclined relative to the tape guides 31 and 33.

Figure 11:
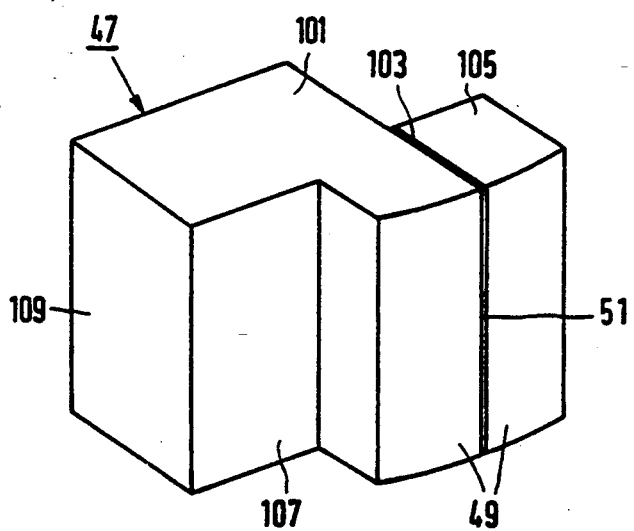
FIG. 11 is a perspective of the magnetic head.
Figure 12:
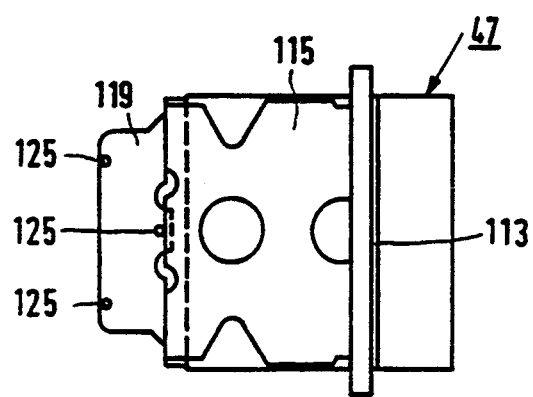
FIG. 12 is a rear view of the magnetic head with a mounting bracket.
Figure 13:
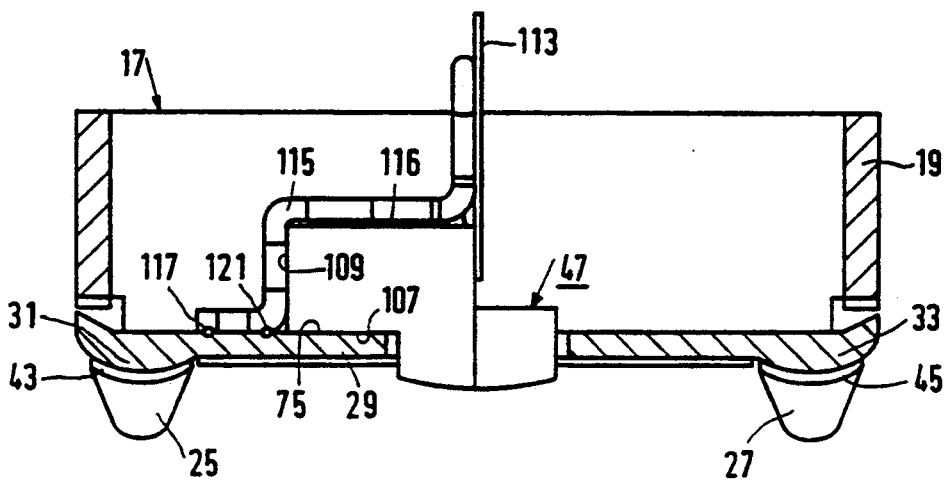
FIG. 13 is a sectional view of the magnetic-head unit provided with the mounting bracket.

FIG. 11 shows the magnetic head 47 of the magnetic-head unit. The magnetic head 47 has two main parts 101 and 105 formed by a substrate and a counter-block. The substrate 101 carries a magnetic-head structure in layers 103, which structure is covered by the counter-block 105. The substrate 101 and the counter-block 105 have been ground to form the head face 49, in which the gap ends 51 of the transducing gaps extend. The substrate is formed with mounting surface 107 by which the magnetic head 47 can be brought into contact with the mounting surface 75 (see FIG. 4) of the front section 29, in order to position the head face 49 relative to the tape guides 31, 33. For this purpose the mounting surface 107 should be formed accurately relative to the head face 49. The substrate 101 has a further mounting surface 109. This surface enables the magnetic head 47 to be secured to the front section 29 via a mounting bracket, so that no adhesive layer is needed between the mounting surfaces 75 and 107 and these mounting surfaces can be accurately in contact with one another. FIGS. 12 and 13 show how the magnetic head is secured to the front section. The magnetic head 47 is secured to a mounting bracket 115 by the mounting surface 109, for example by means of an adhesive layer. The clearance 116 between the rear of the magnetic head 47 and the mounting bracket 115 is filled with a further adhesive layer. The mounting surface 107 of the magnetic head 47 is subsequently brought into contact with the mounting surface 75 of the front section 29. After this the magnetic head 47 is adjusted in such a way that the imaginary connecting line 57, on which the height guides 21, 23 are situated, extends perpendicularly to the gap plane 59 (see FIG. 3). Now the mounting bracket 115 is connected to the front section 29. Before the magnetic head 47 with the mounting bracket 115 is introduced into the housing 18 the magnetic head 47 is connected to a foil 113 provided with electrical conductor tracks. Subsequently, this foil is also attached to the mounting bracket 115, so that the connection between the conductor tracks and the magnetic head is relieved from external forces which may be exerted on the foil 113 when the magnetic-head unit 17 is mounted in the apparatus 1.

After the mounting surface 47 of the magnetic head 47 has been brought into contact with the mounting surface 75 of the front section 29 the mounting bracket 115 is first secured to the front section 29 with an end 117. Subsequently, the mounting bracket 115 is secured to the front section 29 with a portion 121 situated near the magnetic head 47. The mounting bracket 115 then draws the magnetic head 47 against the front section 29. By thus securing the mounting bracket to the front section 29 the adhesive joint between the mounting bracket 115 and the mounting surface 109 is only subjected to compressive stress. The connection between the mounting bracket 115 and the front section 29 can be formed, for example, by three welds 125.

Figure 14:
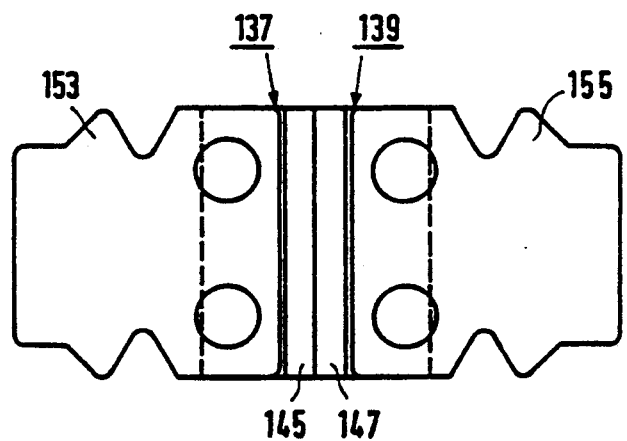
FIG. 14 is a rear view of two other magnetic heads with positioning members.
Figure 15:
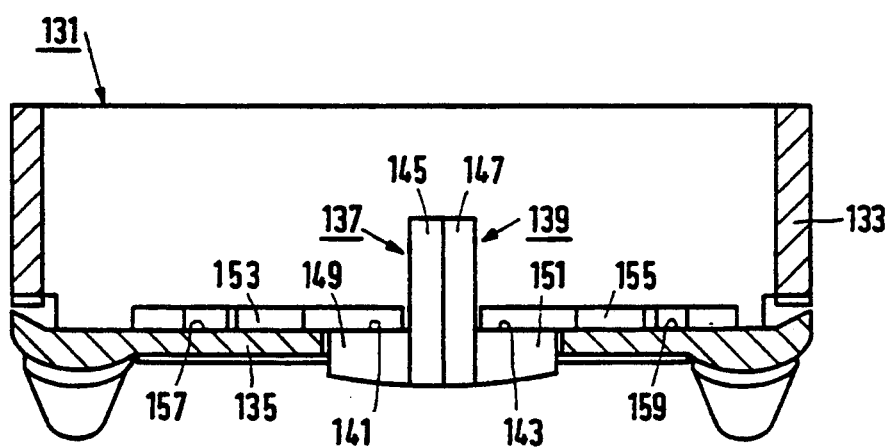
FIG. 15 is a sectional view of the magnetic-head unit provided with the other magnetic heads and positioning members.

FIGS. 14 and 15 show a magnetic-head unit 131 whose housing 133 is identical to that of the magnetic-head unit 17 but whose magnetic head 137, 139 has a different shape. Instead of one head this magnetic-head unit 131 comprises two magnetic heads 137 and 139. In the present case the mounting surface 141,143 is not situated on the substrate 145, 147 but on the counter-block 149, 151. The magnetic heads 137, 139 are positioned relative to the front section 135 via positioning members 153, 155. The positioning members 153, 155 are then in contact with mounting surfaces 157, 159 on the front section 135 and with the mounting surfaces 141,143 on the magnetic heads 137, 139.

Figure 16:
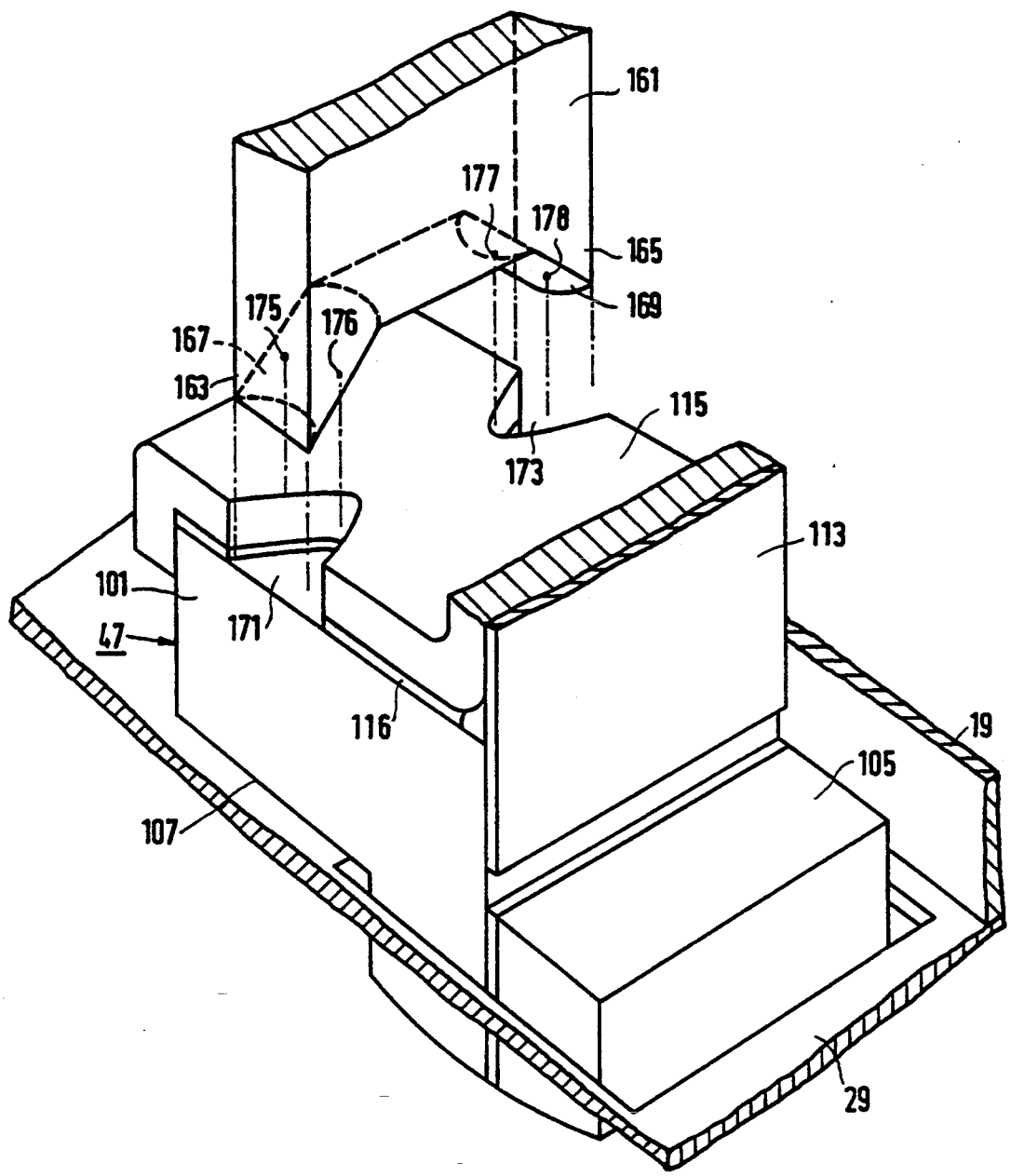
FIG. 16 illustrates the cooperation between the magnetic head and an auxiliary tool for positioning the magnetic head relative to the front section.

How the position of the magnetic head relative to the front section is adjusted will now be described with reference to FIG. 16. After the magnetic head 47 has been connected to the substrate 101 by means of the mounting bracket 115 an auxiliary tool 161 is brought into contact with the mounting bracket 115. The auxiliary tool 161 has two teeth 163, 165 which each comprise a circularly cylindrical wall portion 167, 169. During the cooperation of the auxiliary tool 161 with the mounting bracket 115 the teeth 163, 165 engage in recesses 171,173 in the mounting bracket, each tooth 163, 165 contacting the mounting bracket 115 with only two points 175, 176, 177, 178 and the magnetic head is pressed with its mounting surface 107 against the front section 29. By rotating the auxiliary tool 161 the angle between the gap plane 59 and the imaginary connecting line 57 between the two height guides 21, 23 (see FIG. 3) can be adjusted and by translating the auxiliary tool 161 the distance between the transducing gaps 51 and the connecting line 57 (which in operation coincides with the tape edge 72 of the magnetic tape 71) can be adjusted. As a result of these specially chosen shapes of the recesses 171, 173 and of the teeth 163, 165 the contact between the auxiliary tool 161 and the mounting bracket 115 is established at four points 175, 176, 177, 178, so that the magnetic head exactly follows the translation and rotation of the auxiliary tool 161. This auxiliary tool 161 can be used in the same way for the adjustment of the magnetic heads 137, 139 of the magnetic-head unit 131.

Although the invention has been described above with reference to the drawings it is to be noted that the invention is not at all limited to the embodiments shown in the drawings. The invention likewise relates to all embodiments deviating from those shown in the drawings within the scope defined by the claims. For example, the second mounting surface may be a plane containing three points defined by, for example, three projections on the rear of the front section. It is also possible to provide further control surfaces instead of the height guides, the magnetic tape being positioned in a central position between the control surfaces and the further control surfaces during operation of the apparatus, the two edges of the magnetic tape being in contact with control surfaces.

I claim:

1. A magnetic tape apparatus for cooperating with a magnetic tape, said apparatus comprising:
   a) a magnetic head unit, said magnetic head unit comprising
      i) a magnetic head for communicating with the magnetic tape, said magnetic head having a head face, a transducing gap which terminates in the head face and defines a gap plane, and a first mounting surface which extends at least substantially perpendicularly to said gap plane and at least substantially parallel to said head face; and
      ii) a housing holding said magnetic head, said housing having a front section adjacent said head face, said front section including (a) a pair of tape guides, each located at a respective opposing lateral side of said transducing gap and including a guide surface for engaging a major side of the magnetic tape, said tape guides defining a tangent plane connecting the tape guide surfaces, and (b) a second mounting surface parallel to said tangent plane, said magnetic head being mounted in said housing with said first mounting surface parallel to and in alignment with said second mounting surface; and
   b) tape transport means for transporting said magnetic tape past said transducing gap and in contact with said tape guides.

2. An apparatus as claimed in claim 1, characterized in that the magnetic head has two main parts comprising a substrate, which carries a magnetic-head structure in layers, and a counter-block, which is situated on the magnetic-head structure, the first mounting surface being provided on one of the main parts.

3. An apparatus as claimed in claim 1, characterised in that the mounting surfaces direct are in contact with one another.

4. An apparatus as claimed in claim 3, characterised in that the magnetic head comprises a third mounting surface which extends at least substantially perpendicularly to the first mounting surface, and the magnetic-head unit comprises a mounting bracket which is connected to the magnetic head at the third mounting surface and to the front section.

5. An apparatus as claimed in claim 4, wherein the magnetic-head unit further comprises two height guides each situated at first axial ends of the tape guides and disposed on a connecting line perpendicular to the gap plane through the transducing gap, and two control surfaces integral with the front section situated at second axial ends of the tape guides, opposite the first axial ends, for guiding one tape edge of the magnetic tape to bias the other tape edge in contact with the height guides.

6. An apparatus as claimed in claim 5, characterized in that the magnetic head has two main parts comprising a substrate, which carries a magnetic-head structure in layers, and a counter-block, which is situated on the magnetic-head structure, the first mounting surface being provided on one of the main parts.

7. An apparatus as claimed in claim 4, characterized in that the magnetic head has two main parts comprising a substrate, which carries a magnetic-head structure in layers, and a counter-block, which is situated on the magnetic-head structure, the first mounting surface being provided on one of the main parts.

8. An apparatus as claimed in claim 3, wherein the magnetic-head unit further comprises (i) two height guides each situated at first axial ends of the tape guides and disposed on a connecting line perpendicular to the gap plane through the transducing gap and (ii) two control surfaces integral with the first section and situated at second axial ends of the tape guides for guiding one tape edge of the magnetic tape to maintain the other tape edge in contact with the height guides.

9. An apparatus as claimed in claim 3, characterized in that the magnetic head has two main parts comprising a substrate, which carries a magnetic-head structure in layers, and a counter-block, which is situated on the magnetic-head structure, the first mounting surface being provided on one of the main parts.

10. An apparatus as claimed in claim 1, further comprising a positioning member interconnecting the mounting surfaces.

11. An apparatus as claimed in claim 10, wherein the magnetic-head unit further comprises (i) two height guides each situated at first axial ends of the tape guides and disposed on a connecting line perpendicular to the gap plane through the transducing gap and (ii) two control surfaces integral with the first section and situated at second axial ends of the tape guides for guiding one tape edge of the magnetic tape to maintain the other tape edge in contact with the height guides.

12. An apparatus as claimed in claim 10, characterized in that the magnetic head has two main parts comprising a substrate, which carries a magnetic-head structure in layers, and a counter-block, which is situated on the magnetic-head structure, the first mounting surface being provided on one of the main parts.

13. A magnetic tape apparatus according to claim 1, wherein
said housing comprises a cylindrical section and said cylindrical section and front section are metallic,
said second mounting surface of said front section includes an opening for receiving said magnetic head and said magnetic head is mounted in said opening,
said cylindrical section comprises a first part with tape height guides and an opposing second part including auxiliary tape guides, said first and second parts being fixed to each other with said front section secured between said first and second parts and between said height guides and said auxiliary tape guides, and said housing being effective for providing magnetic shielding to the magnetic head.

14. An apparatus as claimed in claim 1, wherein the magnetic-head unit further comprises (i) two height guides each situated at first axial ends of the tape guides and disposed on a connecting line perpendicular to the gap plane through the transducing gap and (ii) two control surfaces integral with the first section and situated at second axial ends of the tape guides for guiding one tape edge of the magnetic tape to maintain the other tape edge in contact with the height guides.

15. An apparatus a claimed in claim 1, characterized in that the magnetic head comprises a third mounting surface which extends at least substantially perpendicularly to the first mounting surface, and the magnetic-head unit comprises a mounting bracket which is connected to the magnetic head at the third mounting surface and to the front section.

16. A magnetic tape apparatus for cooperating with a magnetic tape, said apparatus comprising:

a) a magnetic head unit, said magnetic head unit comprising i) a magnetic head for communicating with the magnetic tape, said magnetic head having a head face, a transducing gap terminating in the head face and defining a gap plane, a first mounting surface which extends at least substantially perpendicularly to said gap plane and at least substantially parallel to said head face, and a third mounting surface extending at least substantially parallel to said transducing gap; and ii) a housing holding said magnetic head, said housing comprising a cylindrical section and a front section, said front section including (a) a pair of tape guides, each located at a respective opposing lateral side of said transducing gap and including a guide surface for engaging a major side of the magnetic tape, said tape guides defining a tangent plane connecting the tape guide surfaces, and (b) a second mounting surface parallel to said tangent plane, said second mounting surface including an opening for receiving said magnetic head, said cylindrical section comprising a first part with tape height guides and an opposing second part including auxiliary tape guides, said first and second parts being fixed to each other with said front section secured between said first and second parts and between said height guides and said auxiliary tape guides; and iii) a mounting bracket fixed to said third mounting surface on said magnetic head, said magnetic head being mounted in said housing with said first mounting surface in direct contact with said second mounting surface without any intervening elements and with said housing holding said magnetic head, said magnetic head protruding from within said cylindrical section through said opening to the exterior of the housing, with said first and second mounting surfaces in contact with each other said magnetic head being translatable only in directions parallel to said mounting surfaces and rotatable only about an axis normal to said mounting surfaces, and said mounting bracket, which is fixed to said third mounting surface, also being fixed to said first mounting surface to fix said magnetic head in said opening; and b) tape transport means for transporting said magnetic tape past said transducing gap and in contact with said tape guides.

17. A magnetic tape apparatus according to claim 16, wherein said magnetic head comprises a substrate, a head structure comprised of a plurality of layers disposed on said substrate, and a counter block against said head structure, and one of said counter block and said substrate comprises said first mounting surface.

* * * * *